March 27, 1962 S. T. STOOTHOFF 3,026,994
CONVEYING APPARATUS
Original Filed March 29, 1957 3 Sheets-Sheet 1
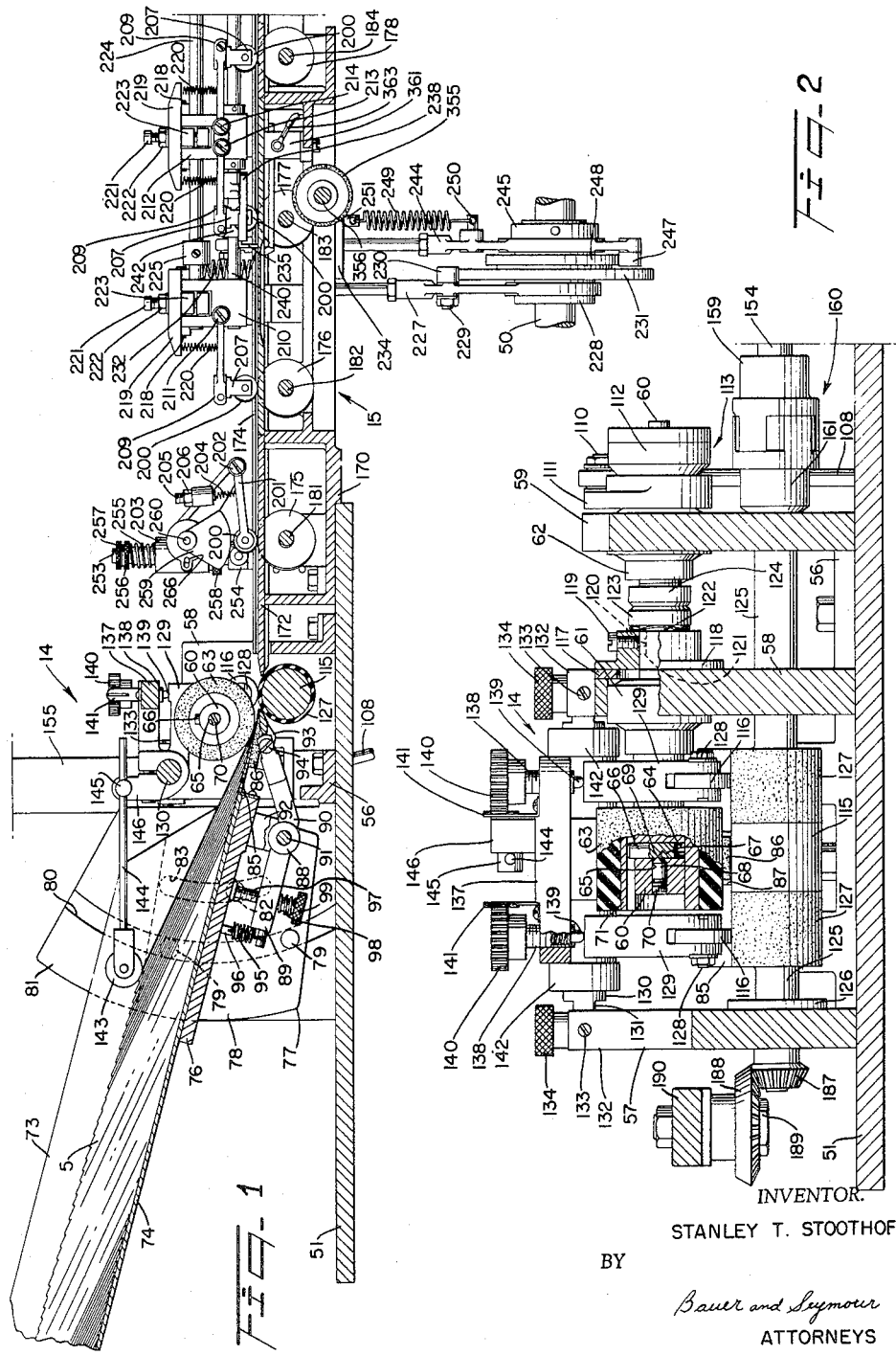
INVENTOR.
STANLEY T. STOOTHOFF
BY
Bauer and Seymour
ATTORNEYS

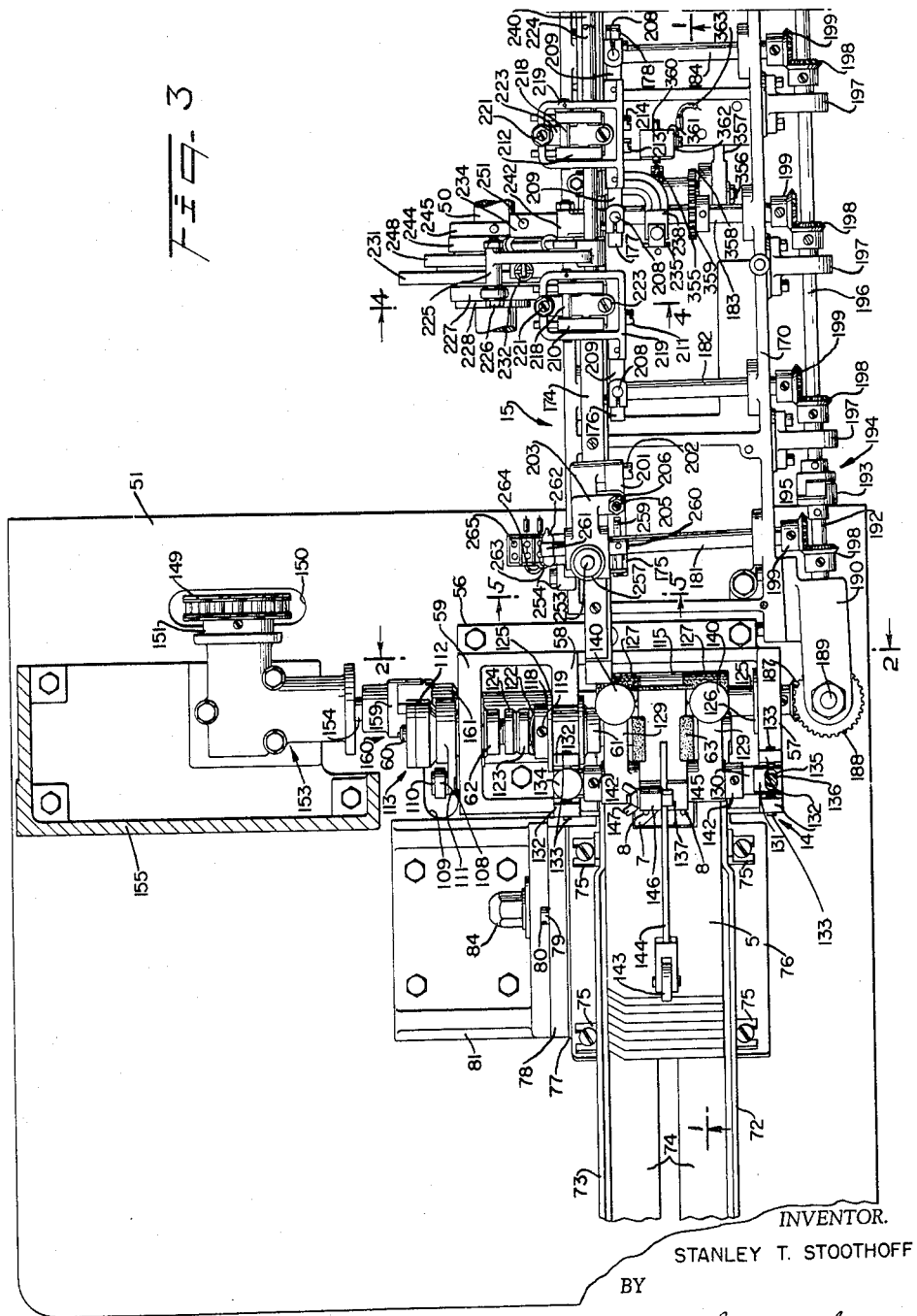

March 27, 1962 S. T. STOOTHOFF 3,026,994
CONVEYING APPARATUS
Original Filed March 29, 1957 3 Sheets-Sheet 3
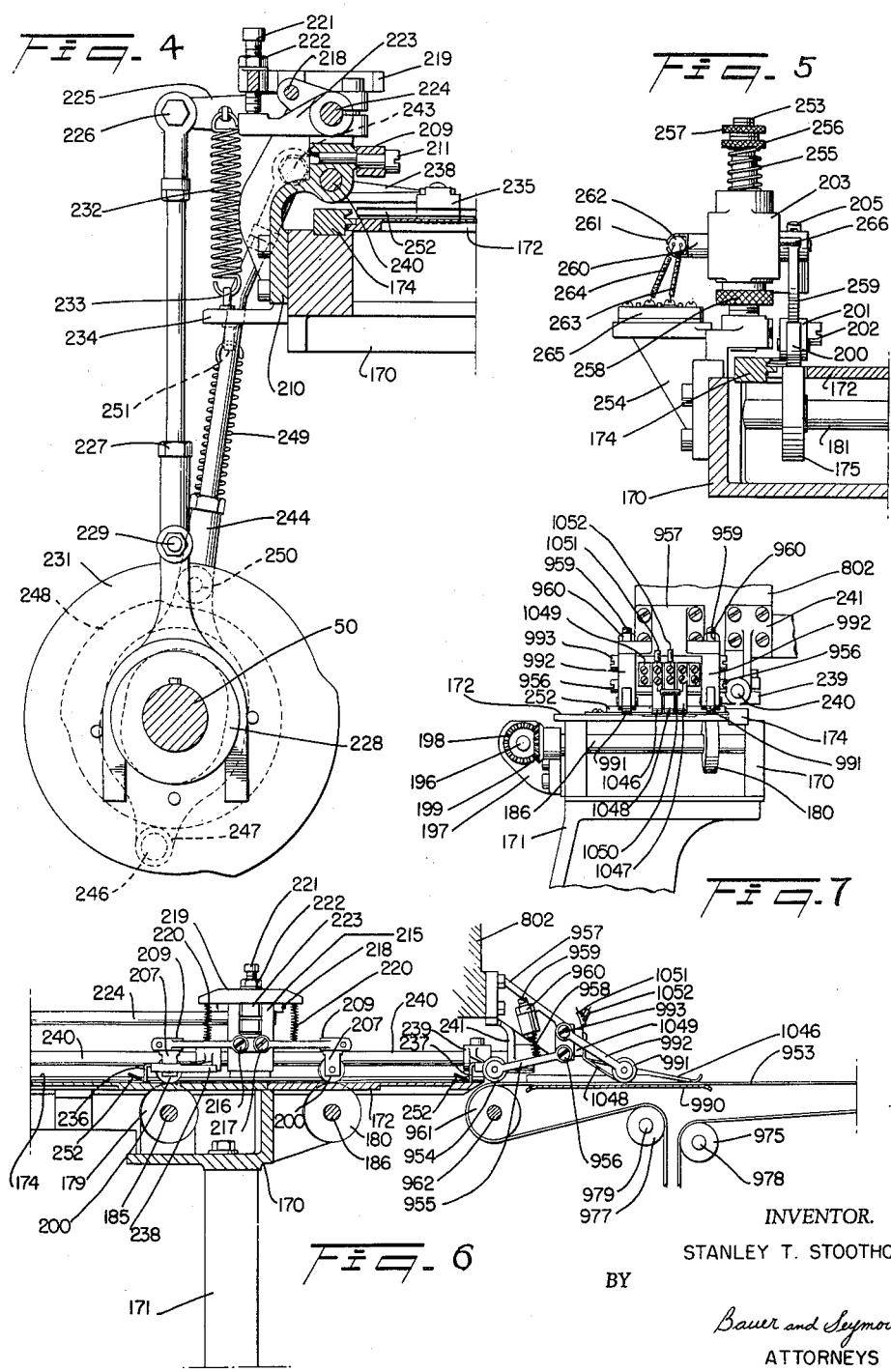
INVENTOR.
STANLEY T. STOOTHOFF
BY
Bauer and Seymour
ATTORNEYS United States Patent Office 3,026,994
Patented Mar. 27, 1962

3,026,994
CONVEYING APPARATUS
Stanley T. Stoothoff, Glen Rock, N.J., assignor, by mesne assignments, to Minnesota Mining and Manufacturing Company, St. Paul, Minn., a corporation of Delaware
Original application Mar. 29, 1957, Ser. No. 649,372. Divided and this application Sept. 28, 1959, Ser. No. 842,793
18 Claims. (Cl. 198—127)

This invention relates to a conveyor and more particularly to a conveyor adapted to carry a plurality of card-like structures sequentially into operative relationship with a series of mechanisms whereby classification cards are produced, each having an image bearing frame of micro-film mounted in an aperture therein.

This application is a division of my copending patent application Serial No. 649,372, filed March 29, 1957 and said application, as originally filed, forms a part of this disclosure and is incorporated herein by reference.

One object is to provide an improved conveyor of the angular roller type which is particularly, but not exclusively, adapted for advancing cards successively along a rectilinear path and in a predetermined lateral position on said conveyor.

Another object is to provide an improved conveyor of the angular roller type which is so constructed and arranged that movements of successive blanks, such as cards, short distances laterally and longitudinally on the conveyor are only required to being said blanks into accurate side registry position, whereby a relatively short and narrow conveyor may be advantageously and effectively employed for the described purpose.

Another object is to provide an improved conveyor of the character above described, wherein the first roller of the series of diagonally extending conveying rollers is disposed such that the angle of inclination thereof is greater than that of the remaining rollers of said series, whereby the successive blanks are quickly side registered against a fixed side guide bar by the action of said first roller, and thereafter maintained in engagement with said side guide bar and moved therealong with minimum friction by the action of said remaining rollers.

Another object is to provide in a conveyor having operable stop means for temporarily arresting the movement of successive blanks, such as cards, and continuously driven elements for conveying said blanks, improved pressure rollers which cooperate with said elements and which are automatically controlled such that different degrees of pressure are applied by said rollers on the blanks, i.e., a minimum or light pressure to hold the blanks against said stop means without buckling, and a maximum or heavy pressure to insure immediate and positive further movement of the blanks without slipping or lagging when released by said stop means.

Another object is to provide an improved calipering or excess thickness detecting mechanism associated in a novel manner with the above-described conveyor of the angular roller type, whereby one of the idler pressure rollers, in addition to its blank conveying function, is effectively and advantageously utilized as the means of said mechanism for gauging the thickness of each blank and causing a desired control function when plural blanks are simultaneously fed and passed between said pressure roller and its companion blank conveying roller.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a vertical sectional view of a portion of the conveyor and showing the card feeding apparatus, said view being taken substantially along line 1—1 of FIG. 3;

FIG. 2 is an enlarged fragmentary vertical sectional view taken along line 2—2 of FIG. 3, showing the mechanism for feeding the cards to the conveyor;

FIG. 3 is a top plan view of the card feeding apparatus and a portion of the conveyor;

FIG. 4 is an enlarged fragmentary vertical sectional view of said conveyor taken along line 4—4 of FIG. 3;

FIG. 5 is a further enlarged fragmentary vertical sectional view taken on the line 5—5 of FIG. 3;

FIG. 6 is an enlarged vertical sectional view of the remaining portion of the card conveyor, including control means and part of a card delivering and stacking unit, said view and that of FIG. 1 being complementary views; and FIG. 7 is an end elevational view of the card conveyor and control means as viewed from the right of FIG. 1, with the belts and other parts of the card delivering and stacking unit omitted for purposes of clearer illustration.

The apparatus constructed in accordance with the present invention and chosen for the purpose of illustration is particularly adapted for conveying a plurality of card-like structures successively into operative relationship with a series of mechanisms which forms each card into a classification card having mounted therein image bearing frames of micro-film. It is to be understood that the invention is not so limited and that the principles herein described are applicable to the conveying of materials other than card-like structures.

There is shown in FIGS. 1 and 3 a plurality of cards 5 of the known statistical or tabulating machine type. Each card 5 is oblong in shape and is formed of single ply cardboard or heavy relatively stiff paper material and has been pre-prepared for the mounting of a frame of micro-film or other insert of like size therein.

The cards 5 are fed to the conveyor 15 by any means such as the card feeding means illustrated and described in my said application Serial No. 649,372. In the card feeder shown therein the cards 5 are separated and advanced successively at timed intervals from the supply stack by the separator roll 63 and presented by said separator roll to and between the feed roll 115 and the pressure rollers 116, said feed roll and pressure rollers serving to further advance the cards in succession and deliver them in like manner to the card conveyor 15 which is constructed, mounted and operated as follows.

The card conveyor 15 serves to advance and present successive cards 5 to the mechanisms for producing the card having a micro-film mounted therein and which are spaced along and mounted at one side of said conveyor. The conveyor 15 also serves to deliver the finished cards from the card producing mechanisms to card delivering and stacking mechanisms. As shown, the conveyor 15 comprises a generally rectangular open frame 170 which is of one-piece construction and is suitably ribbed at spaced points therealong to strengthen and stiffen the same. The frame 170 is supported at the rear thereof on the plate 51 and at the front thereof on a standard 171 and is bolted or otherwise suitably secured to said plate and said standard. The standard 171 is bolted or otherwise suitably secured to the base platform 22 and projects upwardly therefrom. The frame 170 is provided at the top thereof with a plate 172 the upper surface of which is located substantially in the plane of the top of the feed roll 115 and serves to support the cards 5 during movement thereof along the conveyor and while they are temporarily at rest on said conveyor for performance of the card preparing and film mounting operations thereon, as hereinafter described. The plate 172 extends substantially across the entire width of the frame 170 and along the entire length of said frame and may be made in one piece, but the for sake of convenience in gaining access to the various mechanisms for inspection and adjustment purposes, said plate is made in several sections which are individually secured to the frame 170 as by clamp screws.

Suitably secured to the top of the frame 170 at one side thereof and located a slight distance outwardly of the normal line of travel of the cards 5 from the feeder 14 is a side guide in the form of a grooved bar 174 which extends substantially the entire length of the conveyor and projects above and below the upper surface of the sectionalized plate 172. The side guide bar 174 serves to register the successive cards 5 in proper lateral position on the conveyor for accurate performance of the various operations thereon by the various mechanisms for producing the finished cards.

Disposed within the frame 170 and located relatively close to the side guide bar 174 are a plurality of lower feed rollers 175, 176, 177, 178, 179 and 180 which are spaced longitudinally of said frame and are disposed at an angle with respect to said side guide bar and the normal line of travel of the cards 5 along the conveyor. The rollers 175 to 180, inclusive, project through suitable clearance openings in the sectionalized plate 172 to substantially the upper surface of said plate, and said rollers are arranged so that the angle of inclination of each of the rollers 176 to 180, inclusive, is the same and of a slight degree, and that the angle of inclination of the first roller 175 is greater than that of the rollers 176 to 180, inclusive. By virtue of the described arrangement of the rollers 175 to 180, inclusive, and of the associated side guide bar 174, each card 5 received from the feeder 14 by the first angle roller 175 will be advanced by said roller to the second angle roller 176 and during such movement said card will be quickly moved by the roller 175 laterally on the conveyor and registered against said side guide bar, and the registered card will thereafter be maintained against the side guide bar and moved therealong by the other angle rollers 176 to 180, inclusive, with a minimum amount of friction and with little or no crowding of the card against said side guide bar. The spacing between the rolls 175 to 180, inclusive, is less than the length or longer dimension of the cards 5 so that the latter are always under the control of said rollers to insure continued advancing movement thereof along the conveyor. The rollers 175 to 180, inclusive, in the described lateral position thereof engage the cards 5 between the aperture 6 in said cards and the adjacent marginal side edge of the cards. The peripheries of the rollers 175 to 180, inclusive, are preferably roughened, as by knurling the same, so as to provide increased traction of said rollers on the cards.

The inclined rollers 175 to 180, inclusive, are suitably fixed on and rotated by correspondingly inclined shafts 181, 182, 183, 184, 185 and 186, respectively, which extend transversely of the conveyor frame 170 and are journalled at opposite ends thereof in suitable bearings provided in said frame. The rollers 175 to 180, inclusive, are driven continuously and at the same surface speed as that of the feed roll 115. For this purpose, the feed roll 115 has fixed on the shaft section 125 thereof which projects through the portion 57 of the feeder bracket 56, a bevel pinion 187 (FIG. 2) which meshes with and drives an intermediate bevel gear 188. This bevel gear 188 is journalled on a stud 189 suitably secured in a bracket 190 which is bolted or otherwise suitably secured to the conveyor frame 170 exteriorly and at the side thereof opposite the side guide bar 174. The intermediate gear 188, in turn, meshes with and drives a bevel pinion 191 which is of the same size as that of the bevel pinion 187 and is fixed on the rear end of a short shaft 192 which extends through and forwardly beyond the bracket 190 and is journalled in suitable bearings in said bracket. The shaft 192 extends along the adjacent side of the frame 170 in spaced relation thereto and has fixed on the forward end thereof one part 193 of a conventional flexible coupling 194, the other part 195 of which is secured to the rear end of a shaft 196. The shaft 196 is thus driven by the shaft 192 through the coupling 194. The shaft 196 extends along the remaining length of the frame 170 in spaced relation thereto and is supported by and journalled in suitable bearings in several brackets 197 which are spaced along said shaft and are bolted or otherwise suitably secured to said frame. The shaft 192 is disposed at right angles to the inclined shaft 181, and the shaft 196 is disposed at right angles to the inclined shafts 182 to 186, inclusive, and the axes of the shafts 192 and 196 are located in the plane of the axes of the inclined shafts 181 to 186, inclusive. The shafts 192 and 196 have fixed thereon alike bevel pinions 198 which mesh with and drive alike bevel pinions 199 that are fixed on the outwardly projecting ends of the shafts 181 to 186, inclusive, of the inclined rollers 175 to 180, inclusive, respectively. The bevel pinions 198 and 199 are of the same size as that of the bevel pinions 187 and 191.

Cooperating with each of the driven inclined lower rollers 175 to 180, inclusive, to insure positive advancing movement of the cards 5 along the conveyor, is an upper spring-pressed rider wheel or idler pressure roller 200 which is normally disposed at the same angle of inclination as that of the lower roller with which it cooperates. The rider wheel 200 for the inclined roller 175 is journalled on and at one end of an arm 201 which is bifurcated at said end and is pivotally mounted at the other end thereof on an adjustable eccentric stud 202 which is the same as the stud shown in FIG. 4 and indicated at 211, to be hereinafter referred to. The stud 202 is releasably secured in a suitable manner in a bracket 203 which forms a component part of a caliper unit to be hereinafter described which advantageously utilizes the rider wheel 200 on the arm 201 as the means of said unit for gauging the thickness of each card 5 passed between the same and its cooperating lower roller 175. The arm 201 and consequently the rider wheel 200 carried thereby is yieldingly urged downwardly by a coil compression spring 204 to maintain said wheel engaged with its cooperating roller 175 or the top of a card 5 passing between the same, said spring having one end thereof engaged against said arm and the opposite end thereof engaged against a screw 205 which is adjustably threaded in the bracket 203 and is secured in adjusted position by a lock nut 206. The degree of pressure between the driven roller 175 and its cooperating rider wheel 200 may thus be regulated or adjusted as desired or required by turning the adjusting screw 205 in one direction or the other to increase or decrease the tension of the spring 204. The spring 204 is preferably engaged over a short and small diameter pin on the arm 201 and over a similar pin formed on the lower end of the adjusting screw 205 to confine said spring between said arm and said screw. The eccentric stud 202 provides for longitudinal adjustment of the arm 201 and consequently rolling adjustment of the rider wheel 200 on and relative to the driven roller 175 to accurate operating position with respect to said roller.

The rider wheels 200 cooperating with the driven inclined rollers 176 to 180, inclusive, are mounted not only for rolling adjustment on the respective rollers to proper operating positions, but to also enable the angle of inclination thereof to be varied with respect to said rollers whereby the lateral thrust imparted to the cards 5 by the cooperating inclined rollers and rider wheels may be further accurately controlled to a desired degree. Accordingly, these rider wheels 200 are each journalled on and at the lower end of a separator holder 207 which is formed at the top thereof with a round stem 208, and each of said holders is rotatably mounted by its stem 208 and at one end of a separate arm 209 which is split at said end to provide for clamping of the holder in its adjusted angular position to said arm. The sub-assembly comprising the rider wheel 200, the holder 207 and the arm 209 correlated to the driven inclined roller 176 is pivotally mounted on a bracket 210 by an adjustable eccentric stud 211 which is engaged in the other end of said arm and is releasably secured in a suitable manner on said bracket. The sub-assemblies comprising the rider wheels 200, the holders 207 and the arms 209 correlated to the driven inclined rollers 177 and 178, respectively, are pivotally mounted on a single bracket 212 by adjustable eccentric studs 213 and 214, respectively, which are engaged in the other ends of the respective arms 209 and are releasably secured in a suitable manner on said bracket. The eccentric studs 213 and 214 are the same as the stud 211 previously described. The sub-assemblies comprising the rider wheels 200, the holders 207 and the arms 209 correlated to the driven inclined rollers 179 and 180, respectively, are pivotally mounted on a single bracket 215 by adjustable eccentric studs 216 and 217, respectively, which are engaged in the other ends of the respective arms 209 and are releasably secured in a suitable manner in said bracket. The eccentric studs 216 and 217 are the same as the stud 211 previously described. The brackets 210, 212 and 215 are identical in construction and they are bolted or otherwise suitably secured to the conveyor frame 170 at the said guide side thereof and at suitably spaced points along said frame.

The sub-assemblies comprising the rider wheels 200, the holders 207 and the arms 209 are yieldingly urged downwardly under spring pressure so as to maintain said wheels engaged with the respective rollers 176 to 180, inclusive, or with the tops of the cards 5 passing and positioned between said rollers and their cooperating rider wheels. Also, the spring pressure exerted upon the rider wheels 200 of said sub-assemblies is controlled in a novel manner such that while the cards 5 are temporarily at rest on the conveyor and positioned against operable stop means, to be hereinafter described, for arresting the movement of the cards independently of the conveyor at predetermined points spaced along said conveyor and for holding said cards at said points for a pre-determined interval against movement by the conveyor, a relatively light pressure is applied by the rider wheels upon the stopped cards so as to maintain the same against the stop means without buckling of said cards, and just as or immediately after the stop means are operated to release the stopped cards for further movement by the conveyor, a relatively heavy pressure is applied by the rider wheels upon the released cards whereby instant and positive further movement of the released cards by the conveyor will occur and is assured without slipping or lagging of the cards on said conveyor. The described variable pressure is applied to all of the rider wheels 200 in unison and is effected during each cycle of operation of the machine by elements which are constructed, mounted, operated and controlled as follows.

Each of the brackets 210, 212 and 215 has mounted thereon for pivotal movement about a horizontal longitudinal axis, as at 218, a lever 219 which is constructed to surround the upper forked end of the bracket and to provide at the inner side thereof a longitudinal portion which, in the case of the brackets 212 and 215, overlies both arms 209 on each of said brackets, and in the case of the bracket 210, overlies the single arm 209 thereon. A coil compression spring 220 is disposed between the single arm 209 carried by the bracket 210 and the lever 219 on said bracket, and between each arm 209 carried by the bracket 212 and the lever 219 on said bracket, and between each arm 209 carried by the bracket 215 and the lever 219 on said bracket. Each spring 220 has one end thereof engaging against the respective arm 209 and the opposite end engaging against the respective lever 219 and is preferably engaged over short and small diameter pins on the arm and the lever to confine the same therebetween. Each of the levers 219 is provided in the outer portion thereof with an adjustable abutment member 221 in the form of a machine screw threaded therein and locked in adjusted position by a lock nut 222. The abutment members 221 on all of the levers 219 are arranged and adjusted to be simultaneously engaged by arms 223 which are disposed within and project outwardly from the forked upper ends of the brackets 210, 212, and 215 and are clamped to or otherwise suitably fixed on a rock shaft 224. The rock shaft 224 extends longitudinally of the conveyor and is journalled in suitable bearings in the brackets 210, 212 and 215.

Keyed and suitably secured to the rock shaft 224 at a suitable position therealong and preferably adjacent to and forwardly of the bracket 210 is a lever 225 which projects outwardly from said shaft beyond the adjacent side of the conveyor frame 170. Pivotally connected by a pin 226 to the free end of the lever 225 is the upper end of a cam strap 227 the lower end of which is engaged over and guided by a grooved hub 228 which is keyed and suitably secured to the cam shaft 50. Disposed above the cam shaft 50 and journalled at 229 on the cam strap 227 is a cam follower 230 which engages a cam 231 that is bolted or otherwise suitably secured to the hub 228. The follower 230 is yieldingly held in engagement with the cam 231 by a coil extension spring 232 having one end thereof connected to the lever 225 and the other end connected at 233 to an angle bracket 234 which is bolted or otherwise suitably secured to the conveyor frame 170. The shaft 224 is thus cam operated in one direction and spring operated in the opposite direction by the cam 231 and the spring 232, respectively, to rock all of the arms 223 on said shaft in unison. It will thus be apparent that when the arms 223, through continued rotation of the cam 231 and engagement of the follower 230 with the high part of said cam, are cam operated in unison in a clockwise direction as viewed in FIG. 4, positive pivotal movement will be imparted to the levers 219 in unison in the same direction by said arms through engagement thereof with the abutment members 221, and consequently all of the springs 220 will be compressed in unison by said levers, thereby applying increased pressure upon all of the rider wheels 200 in unison. When the arms 223 are thereafter spring operated in the opposite direction by the spring 232 upon continued rotation of the cam 231 and engagement of the follower 230 with the low part of said cam, the levers 219 are released by said arms and caused to follow the latter by the expanding action of the springs 220, thus relieving some of the pressure upon the rider wheels 200. The springs 220 initially are of alike tension, and with the follower 230 engaged with the low part of the cam 231, the tension of said springs is adjusted by means of the abutment members 221 so that a light pressure is applied thereby upon the rider wheels 200 sufficient to hold the cards 5 against the stop means without buckling of the same and rebounding thereof from said stop means.

The stop means previously referred to for the cards 5 functions in connection with each of said card producing mechanisms to simultaneously arrest the forward movement of successive cards on and independently of the conveyor for a predetermined interval and in predetermined operative positions with respect to said mechanisms. Accordingly, the stop means correlated to each of said card producing mechanisms comprises, in the illustrated embodiment, single fingers 235, 236 and 237, respectively, which are rocked in unison from upper positions in which they are out of the path of travel of the cards 5 to lower positions in which they are in the path of travel of the cards to be engaged by their leading edges. The stop fingers 235, 236 and 237 are spaced longitudinally of the conveyor predetermined distances apart. The stop fingers 235 and 236 are each suitably secured to the free end of a rearwardly projecting portion of an arm 238, which in plan view, is of angular formation and projects transversely of the conveyor over the side guide bar 174. The stop finger 237 is suitably secured to the free inner end of an arm 239 which projects over the side guide bar 174 transversely of the conveyor. The arm 238 carrying the stop fingers 235 and 236, and the arm 239 carrying the stop finger 237, are all keyed and suitably clamped at their outer lateral ends to a rock shaft 240 which extends longitudinally of the conveyor and is journalled in suitable bearings provided in the brackets 210, 212 and 215, and in an additional bracket 241 which is bolted or otherwise suitably secured to the frame of the mechanism 20 to be hereinafter described. The stop fingers 235, 236 and 237 in their lower operative card engaging and stopping positions project downwardly beyond the upper surface of the sectionalized card supporting plate 172 through suitable clearance openings formed in said plate.

The arms 238 and 239 and consequently the stop fingers 235, 236 and 237 carried thereby are rocked in unison once during each cycle of operation of the machine in timed relation with the feeding of the card 5 and the operations of each of said card producing mechanism. For this purpose, the rock shaft 240 has keyed and suitably secured thereto adjacent the lever 225 a lever 242 which projects outwardly from said shaft. Pivotally connected by a stud 243 to the free end of the lever 242 is the upper end of a cam strap 244 the lower end of which is engaged over and guided by the hub 228 on the cam shaft 50. The cam strap 244 is retained on the hub 228 by a collar 245 suitably secured to said hub. Disposed below the cam shaft 50 and journalled at 246 on the cam strap 244 is a cam follower 247 which engages a cam 248 that is bolted or otherwise suitably secured to the hub 228. The follower 247 is yieldingly held in engagement with the cam 248 by a coil extension spring 249 having one end thereof connected at 250 to the cam strap 244 and the opposite end connected at 251 to the angle bracket 234. The rock shaft 240 is thus cam operated in one direction and spring operated in the opposite direction by the cam 248 and the spring 249, respectively, to rock all of the arms 238 and 239 thereon in unison, whereby the stop fingers 235, 236 and 237 will be moved downwardly in unison by the spring 249 into the path of travel of successive cards 5 to be engaged by their forward or leading edges, and upwardly in unison by the cam 248 out of said path to simultaneously release the cards for further advancing movement by the conveyor.

The stop fingers 235, 236 and 237 are so arranged that when the forward motion of three successive cards 5 is arrested by said stop fingers, the cards will be in proper operating positions with respect to said respective card producing mechanisms, and they will still be under the influence of the continuously driven conveyor rollers 176, 178 and 180, respectively, and the rider wheels 200 cooperating with said rollers. Under these conditions, the cards 5 will be continuously urged against their respective stop fingers 235, 236 and 237 and thereby held against displacement during the performance of operations thereon, the rollers 176, 178 and 180 at this time slipping relative to their respective cards, and the pressure of the rider wheels 200 being relieved and insufficient, as hereinbefore described, to buckle said cards. When the arrested cards 5 are simultaneously released upon upward movement of the stop fingers 235, 236 and 237, they will immediately be taken over by the respective rollers 176, 178 and 180 and the cooperating rider wheels 200, and, through increased pressure applied at this time by all of the rider wheels on the cards, as hereinbefore described, they will be instantly and positively advanced from their stop positions and moved further along the conveyor. The described downward and upward movements of the stop fingers 235, 236 and 237 occur in planes normal to the plane of travel of the cards 5, and when said stop fingers are raised to release the cards engaged thereby, upward displacement of said cards with and by the stop fingers is prevented by strippers 252. These strippers 252 extend transversely of the path of travel of the cards and are located above said path and adjacent to the stop fingers 235, 236 and 237, and they are suitably secured to the plate 172 only at the ends thereof opposite the side guide bar 174.

As previously stated, the rider wheel 200 which cooperates with the driven inclined conveyor roller 175 to advance the successive cards 5, also advantageously serves as the means of a card calipering or excess card detecting device for gauging the thickness of each card passed between said roller and said rider wheel. This calipering or excess card detecting device functions to cause a control action of the machine, such as stopping of the machine, in the event more than one card 5 at a time is passed between the driven roller 175 and its companion rider wheel 200. As herein shown, the card calipering or excess card detecting device comprises the following elements which are constructed, mounted and operated as follows, and include the previously described bracket 203, and the rider wheel 200 cooperating with the conveyor roller 175.

The bracket 203 is keyed to a vertically extending stem 253 for vertical sliding movement on said stem without relative rotation. The stem 253 is suitably secured at its lower end in a bracket 254 which is bolted or otherwise suitably secured to the adjacent side of the conveyor frame 170. The stem 253 is rotatably positioned in the bracket 254 such that the bracket 203 will be disposed at the same angle of inclination as that of the driven conveyor roller 175. Disposed above the bracket 203 and surrounding the stem 253 is a coil compression spring 255 having one end thereof engaging against said bracket and the opposite end engaging against an adjusting nut 256 threaded on said stem. The adjusting nut 256 is locked in adjusted position by a lock nut 257 also threaded on the stem 253 and engaging said adjusting nut. The spring 255 normally tends to yieldingly move the bracket 203 downwardly relative to the stem 253, such movement, however, being limited and regulated by an adjusting nut 258 also threaded on said stem and engaging the lower end of said bracket. The bracket 203 may thus be raised relative to the stem 253 by rotating the adjusting nut 258 in one direction, and may be lowered by the spring 255 and rotation of said nut in the other direction. The bracket 203 will be yieldingly held in engagement with the adjusting nut 258 by the expanding action of the spring 255 the tension of which may be regulated by the adjusting nut 256 to resist normal upward displacement of said bracket away from the nut 258.

Disposed above and cooperating with the rider wheel 200 carried by the bracket 203 is a normally stationary caliper element 259 which may be of any suitable form and as hereinshown is in the form of a segment. The caliper segment 259 is disposed at the same angle of inclination as that of the conveyor roller 175 and its companion rider wheel 200 and is suitably fixed on the inwardly projecting end of a horizontal pin 260 which is journalled in a suitable bearing provided in the bracket 203 and projects outwardly beyond said bracket. Secured to the outwardly projecting end of the pin 260 is a spring clip 261 within which is yieldingly clamped a normally open electrical switch 262 of the mercury type having conductors 263 and 264 leading therefrom and connected to a terminal block 265. The terminal block 265 is suitably secured to the bracket 254, and the conductors 263 and 264 and consequently the mercury switch 262 are connected in the electrical control circuit for the machine as set forth in application S.N. 649,372. With the caliper segment 259 in the normal position thereof shown in FIG. 8, the mercury switch 262 is positioned on the pin 260 such that the mercury therein is caused to flow away from the contacts of said switch, whereby the electrical control circuit in which said switch is connected will be normally broken. With a single card 5 of normal thickness placed between the conveyor roller 175 and its companion rider wheel 200, the bracket 203 is raised or lowered through rotation of the adjusting nut 258 until the caliper segment 259 in the normal position thereof is spaced from said rider wheel a distance slightly less than the normal thickness of a single card.

It will thus be apparent that as long as single cards 5 are passed between the conveyor roller 175 and its companion rider wheel 200 during the normal operation of the machine, said rider wheel will not be raised by the single cards sufficiently to contact the caliper segment 259. Under these conditions the caliper segment 259 will not be rotated, the switch 262 will not be actuated and, hence, the machine will continue to operate in the normal usual manner. However, should a card 5, for some reason, be accompanied by or contain another or excess card 5 adhering thereto as it passes between the conveyor roller 175 and companion rider wheel 200, said rider wheel will be raised by the double or plural cards sufficiently to contact the segment 259, and, through rotation of said rider wheel by the advancing cards, said caliper segment will be rotated by said rider wheel in a clockwise direction as viewed in FIG. 1. Under these conditions the switch 262 will be rotated by the segment 259 through the pin 260, thus causing the mercury in said switch to flow toward and connect the contacts of the switch, thereby closing the circuit to effect stopping of the machine in a manner as set forth in my said co-pending application. The extent of rotation of the caliper segment 259 by the rider wheel 200 is limited to the angular circuit closing position of the switch 262 by a pin 266 which is secured in the bracket 203 and projects inwardly therefrom into the path of rotation of said segment. When the excess cards are thereafter removed from between the conveyor roller 175 and companion rider wheel 200 accompanied by a pivotal downward movement of said rider wheel away from the caliper segment 259, said segment will thus be released by the rider wheel and will return by gravity to its normal position, whereupon the switch 262 will likewise be returned to its original position causing the mercury therein to flow away from the contacts and again break the circuit. Following this, the machine may again be started for continued feeding and processing of the cards 5.

The driven inclined conveyor rollers 175 and 176 and the rider wheels 200 cooperating therewith serve to advance each card 5 into engagement with the side guide 174 and with the first card stop 235, and said side guide and said stop serve to locate said card in accurate register with the first of said card producing mechanisms which is constructed, mounted and operated as set forth in said application S.N. 649,372.

While only one embodiment of the present invention has been described in the foregoing specification and illustrated in the accompanying drawings in connection with one specific purpose, it will be apparent that various omissions and substitutions and changes in the form and details of the machine illustrated and its operation may be made by those skilled in the art without departing from the spirit and scope of the invention. The present invention may be embodied in machines other than card processing machines and may be associated and employed for various purposes independently. It is not intended, therefore, that the present invention shall be limited to the embodiment shown nor otherwise than by the terms of the appended claims.

What is claimed is:

1. In a machine for handling cards, sheets, and the like articles, a side guide located at one side of and extending along a horizontal rectilinear path travelled by successive articles, a conveyor comprising a driven roller at the receiving end of said conveyor and inclined in the direction of said side guide for advancing the articles successively along said path and laterally into engagement with said side guide, and other driven rollers inclined in the direction of said side guide at a lesser degree of inclination than that of said first-named roller for advancing said articles further along said path while maintaining the same with minimized friction in engagement with said side guide during such further movement thereof.

2. In a machine for handling cards, sheets, and the like articles, a conveyor comprising a series of longitudinally spaced transversely extending driven rollers for supporting and advancing such articles along a horizontal rectilinear path, said guide means for guiding the articles for straight-line movement along said path, rider wheels arranged to frictionally cooperate with said rollers to increase the tractive effort of said rollers on the articles, and means mounting each of said rider wheels for rolling adjustment forwardly and rearwardly on its respective roller and to enable positioning thereof independently of said rolling adjustment with its plane inclined at different angles forwardly and outwardly toward said side guide means.

3. In a machine for handling cards, sheets, and the like articles, a side guide located at one side of and extending along a horizontal rectilinear path travelled by successive articles, a conveyor comprising a series of driven rollers extending diagonally of said path for supporting and advancing the articles successively along said path and toward and along said side guide in contact therewith, rider wheels arranged to frictionally cooperate with said rollers to increase the tractive effort thereof on the articles, and means mounting each of said rider wheels for rolling adjustment on its respective roller and to enable positioning thereof independently of said rolling adjustment at the same angle of inclination as that of its roller as well as at other angles of inclination with respect to its roller and said side guide.

4. Apparatus as defined in claim 3 wherein said mounting means for each of said rider wheels comprises a bracket, an eccentric stud adjustably secured on said bracket, an arm pivotally mounted on said eccentric stud, and a holder rotatably carrying the rider wheel and mounted on said arm for rotation about a vertical axis.

5. In a machine for handling cards, sheets, and the like articles, a side guide located at one side of and extending along a horizontal rectilinear path travelled by successive articles, a conveyor comprising a series of driven rollers spaced longitudinally of and extending diagonally across said path for supporting and advancing the articles successively along said path and toward and along said side guide in contact therewith, rider wheels cooperating with said rollers to increase the tractive effort of said rollers on the articles, means for delivering successive articles to said conveyor with the side edges thereof nearest said side guide located relatively close to said side guide, the spacing between said rollers being less than the dimension of the articles extending in the direction of travel of the articles, the first of said rollers and its companion rider wheel receiving the successive articles being inclined at an angle sufficient to move each article into engagement with said side guide before the same reaches the next or succeeding roller of said series, and the remaining rollers of said series and the rider wheels cooperating therewith being inclined at an angle less than that of the said first roller and of a degree whereby the article is maintained in engagement with said side guide and caused to move therealong with minimum friction, means for adjustably mounting said rider wheels whereby the angle of inclination of each wheel with respect to its cooperating roller and the side guide and whereby the relative position of the axes of the cooperating roller and rider wheel may be selectively predetermined.

6. In a machine for handling cards, sheets, and the like articles, a continuously driven element and a rider wheel cooperating continuously with said element to advance such articles successively received therebetween, resilient means acting on said rider wheel for continuously urging the same toward said driven element and normally applying a yieldable normal pressure thereon, operable stop means movable into and out of the path of said articles for arresting the movement of each advancing article for a predetermined interval while the same is still engaged by said driven element and said rider wheel and said normal pressure is applied on said rider wheel and for thereafter releasing said article for further movement by said element and said rider wheel beyond said stop means, means for moving said stop means into and out of article arresting position, and means operable in timed relation with the operation of said stop means for increasing the pressure exerted by said resilient means on said rider wheel substantially simultaneously with the movement of said stop means out of article arresting position and release of the arrested article thereby.

7. In a machine for handling cards, sheets, and the like articles, a side guide disposed at one side of and extending along a horizontal path travelled by successive articles, means for feeding the articles successively along said path and along and in engagement with said side guide, said feeding means comprising a continuously driven roller extending across said path and inclined in the direction of said side guide, and a rider wheel cooperating continuously with said roller and likewise inclined toward said side guide, resilient means acting on said rider wheel for continuously urging the same toward said roller and for normally applying a yieldable normal pressure thereon, operable stop means movable into and out of said path and disposed forwardly of said driven roller for stopping each advancing article independently of said roller and said rider wheel for a predetermined interval and for thereafter releasing the stopped article for further movement by said rider wheel and said roller beyond said stop means, means for moving said stop means into and out of said path, and means operable in timed relation with the operation of said stop means for increasing the pressure exerted by said resilient means on said rider wheel substantially simultaneously with the movement of said stop means out of said path and release of the stopped article thereby.

8. In a machine for handling cards, sheets, and the like articles, a continuously driven lower element and an upper rider wheel cooperating continuously with said element for advancing such articles successively received therebetween, an arm supporting said rider wheel for pivotal movement toward said element, a second arm overlying said first-named arm and mounted for pivotal movement toward and away from said first-named arm, a coil compression spring disposed between and engaging said arms and acting to yieldingly press said rider wheel against said element with a normal pressure, operable stop means movable into and out of the path of said articles for stopping each advancing article independently of said element and said rider wheel for a predetermined interval and for thereafter releasing the stopped article for further movement by said element and said rider wheel beyond said stop means, means for moving said stop means into and out of the path of movement of the articles, and means operable in timed relation with the operation of said stop means for actuating said second arm downwardly toward said first-named arm substantially simultaneously with the movement of said stop means out of the path of the article and release of the stopped article thereby so as to compress said spring and thereby increase the pressure exerted by said spring on said rider wheel.

9. Apparatus as defined in claim 8 wherein said means for actuating said second arm includes an arm disposed in operative relation with said second arm, and an adjustable abutment member carried by one of said arms and engageable with the other of said arms.

10. In a machine for handling cards, sheets, and the like articles, a conveyor for advancing such articles successively along a horizontal path, said conveyor comprising a plurality of lower rollers extending across and spaced longitudinally of said path, means for continuously driving said rollers, a plurality of upper rider wheels cooperating continuously with said rollers to increase the tractive effort of said rollers on the articles, resilient means acting in unison on said rider wheels to continuously urge the same downwardly toward their respective rollers and to normally apply a yieldable normal pressure thereon, a plurality of stops spaced at predetermined points along said path and movable into and out of said path for arresting the movement of successive articles at said points independently of said conveyor for a predetermined interval and for thereafter releasing said articles for further movement by said conveyor beyond said stops, means for moving said stops in unison into and out of the path of movement of the articles, and means operable in timed relation with the operation of said stops and acting on said resilient means in unison to increase the pressure exerted thereby on said rider wheels substantially simultaneously with the movement of said stops out of the path of the articles and release of the arrested articles thereby.

11. In a machine for handling cards, sheets, and the like articles, conveyor means for supporting and advancing such articles successively along a horizontal path, stop means operable downwardly into and upwardly out of said path in a plane normal to said path for arresting the movement of each article for a prdetermined interval and for thereafter releasing the article for further movement by said conveyor means beyond said stop means, means for operating said stop means, and stripper means disposed adjacent said stop means for preventing upward displacement of the arrested article with and by said stop means upon upward movement thereof out of said path.

12. In a machine for handling cards, sheets and the like articles, a side guide disposed at one side of and extending along a horizontal path travelled by successive articles, conveyor means for receiving successive articles and advancing the same in like manner along said path and along and in engagement with said side guide, said conveyor means comprising a series of continuously driven lower rollers spaced along said path and inclined in the direction of said side guide, a series of upper rider wheels cooperating continuously with said driven roller and likewise inclined toward said side guide, means supporting each of said rider wheels for movement toward and away from its respective roller, biasing means acting upon each of said rider wheels and yieldingly urging the same toward and into engagement with its respective roller while permitting yielding movement thereof away from said roller upon the passage of an article between the same, and means controlled by the first rider wheel of said series for causing a desired control action of the machine upon movement of said rider wheel an increased extent away from its companion roller due to the passage of plural articles simultaneously between said rider wheel and said roller.

13. In a machine for handling cards, sheets and the like articles, continuously driven conveyor means for receiving such articles successively and advancing the same in like manner along a horizontal path, and article calipering means associated with said conveyor means and arranged adjacent the article receiving end thereof, said article calipering means comprising, a bracket mounted for vertical adjustment downwardly toward and upwardly away from said conveyor means, an arm mounted on said bracket for relative pivotal movement about a horizontal transverse axis toward and away from said conveyor means, a rider wheel journalled on said arm and engaged with the articles travelling over said conveyor means to increase the tractive effort of said conveyor means on said articles, spring means on said bracket and continuously acting upon said arm to yieldingly urge said rider wheel downwardly toward and into engagement with said conveyor means while permitting yielding movement thereof upwardly away from said conveyor means by an article passing between the same and said conveyor means, a normally stationary caliper element overlying said rider wheel and mounted on said bracket for rotation about a horizontal transverse axis disposed in vertical alignment with the axis of said rider wheel, resilient means acting on said bracket to yieldingly urge the same downwardly toward said conveyor means, an adjustable abutment engaged by said bracket to limit the downward movement thereof by said resilient means to a normal vertical position in which said caliper element is normally spaced from said rider wheel a distance greater than the thickness of a single article but slightly less than the combined thicknesses of two of said articles, said caliper element being engaged and rotated by said rider wheel upon pivotal movement of the latter an increased extent away from said conveyor means due to the passage of plural articles simultaneously between said rider wheel and said conveyor means, and means responsive to the rotation of said caliper element by said rider wheel for causing a desired control action such as stopping of the machine.

14. Apparatus as defined in claim 13 wherein said responsive means comprises a mercury switch operatively connected to said caliper element for rotation thereby, said switch being connected in an electric control circuit for the machine and when rotated by said caliper element affecting said circuit to cause stopping of the machine, and comprising means on the bracket for limiting the rotation of said caliper element and said switch by said rider wheel to a partial revolution.

15. In a machine for handling cards, sheets and the like articles, a continuously driven element and a rider wheel cooperating continuously with said element to advance such articles successively received therebetween, resilient means acting on said rider wheel for continuously urging the same toward said driven element and normally applying a yieldable normal pressure thereon, operable stop means movable into and out of the path of said articles for arresting the movement of each advancing article for a predetermined interval while the same is still engaged by said driven element and said rider wheel and said normal pressure is applied on said rider wheel and for thereafter releasing said article for further movement by said element and said rider wheel beyond said stop means, and means for moving said stop means into and out of article arresting position.

16. In a machine for handling cards, sheets, and the like articles as defined in claim 15 and comprising stripper means disposed adjacent said stop means for preventing upward displacement of the arrested article with and by said stop means upon upward movement thereof out of said path.

17. In a machine for handling cards, sheets and the like articles, a side guide disposed at one side of and extending along the horizontal path travelled by successive articles, means for feeding the articles successively along said path and along and in engagement with said side guide, said feeding means comprising a continuously driven roller extending across said path and inclined in the direction of said side guide, and a rider wheel cooperating continuously with said roller and likewise inclined toward said side guide, resilient means acting on said rider wheel for continously urging the same toward said roller and for normally applying a yieldable normal pressure thereon, operable stop means movable into and out of said path and disposed forwardly of said driven roller for stopping each advancing article independent of said roller and said rider wheel for a predetermined interval and for thereafter releasing the stop means for operable movement by said rider wheel and said roller beyond said stop means, and means for moving said stop means into and out of said path.

18. In a machine for handling cards, sheets and the like articles, a side guide disposed at one side of and extending along the horizontal path travelled by successive articles, conveyor means for receiving successive articles and advancing the same in like manner along said path and along and in engagement with said side guide, said conveyor means comprising a series of continuously driven lower rollers spaced along said path and inclined in the direction of said side guide, a series of upper rider wheels cooperating continuously with said driven roller and likewise inclined toward said side guide, means supporting each of said rider wheels toward and away from said respective roller, biasing means acting upon each of said rider wheels and yieldably urging the same toward and into engagement with each respective roller while permitting yielding movement thereof away from said roller upon the passage of an article between the same, means controlled by the first rider wheel of said series for causing a desired control action of the machine upon movement of said rider wheel an increased extent away from its companion roller due to the passage of plural articles simultaneously between said rider wheel and said roller, a plurality of stops spaced at predetermined points along said path and movable into and out of said path for urging the movement of successive articles at said points independent of said conveyor for a predetermined interval and for thereafter releasing said articles for further movement by said conveyor beyond said stops, and means for moving said stops in unison into and out of the path of movement of the articles.

References Cited in the file of this patent
UNITED STATES PATENTS

| | | |
|---|---|---|
| 2,008,049 | Staude | July 16, 1935 |
| 2,873,840 | Kerr et al. | Feb. 17, 1959 |